United States Patent
Sarab

(10) Patent No.: US 10,089,320 B2
(45) Date of Patent: Oct. 2, 2018

(54) METHOD AND APPARATUS FOR MAINTAINING DATA CONSISTENCY IN AN IN-PLACE-UPDATE FILE SYSTEM WITH DATA DEDUPLICATION

(71) Applicant: Atlantis Computing, Inc., Mountain View, CA (US)

(72) Inventor: Farshid Eslami Sarab, San Jose, CA (US)

(73) Assignee: HIVEIO INC., Hoboken, NJ (US)

( * ) Notice: Subject to any disclaimer, the term of this patent is extended or adjusted under 35 U.S.C. 154(b) by 430 days.

(21) Appl. No.: 14/815,507

(22) Filed: Jul. 31, 2015

(65) Prior Publication Data

US 2017/0031946 A1    Feb. 2, 2017

(51) Int. Cl.
    *G06F 17/00*     (2006.01)
    *G06F 17/30*     (2006.01)

(52) U.S. Cl.
    CPC .............. *G06F 17/30156* (2013.01)

(58) Field of Classification Search
    CPC ................................ G06F 17/30156
    See application file for complete search history.

(56) References Cited

U.S. PATENT DOCUMENTS

| | | | | |
|---|---|---|---|---|
| 5,201,044 A | * | 4/1993 | Frey, Jr. | ............... G06F 11/1471 714/16 |
| 5,586,291 A | * | 12/1996 | Lasker | ................ G06F 11/1435 711/113 |
| 8,996,800 B2 | | 3/2015 | Venkatesh et al. | |
| 2016/0077756 A1 | * | 3/2016 | Raj | ........................ G06F 3/0608 711/162 |
| 2017/0017527 A1 | * | 1/2017 | Halim | ....................... G06F 9/52 |

* cited by examiner

*Primary Examiner* — Cheryl Lewis
(74) *Attorney, Agent, or Firm* — Womble Bond Dickinson (US) LLP

(57) ABSTRACT

A method and apparatus is disclosed herein for maintaining data consistency in persistent memory in an in-place-update file system of a deduplication computing system. The method may include receiving a data write request to write a block of data from a volatile memory to a non-volatile memory in an in-place-update file system of deduplication computing system. Furthermore, the method may include determining whether the data write request is to perform an in-place update of an existing block in the non-volatile memory, and converting a type of write operation associated with the request from a requested write operation type to a new data allocation write operation when the data write request modifies the existing block. Furthermore, the method may include processing the new data allocation write operation to write the block of data from the volatile memory to the non-volatile memory using an ordered sequence of file system data journaling and writes to the non-volatile memory.

19 Claims, 6 Drawing Sheets

METHOD AND APPARATUS FOR MAINTAINING DATA CONSISTENCY IN AN IN-PLACE-UPDATE FILE SYSTEM WITH DATA DEDUPLICATION

TECHNICAL FIELD

Embodiments of the invention relate to the field of data storage, and more particularly, to maintaining data consistency in persistent memory in an in-place-update file system of a deduplication computing system.

BACKGROUND

Virtual machine hypervisors, or virtual machine monitors, are responsible for creating and running virtual machines on a host machine. The virtual machine hypervisor provides a simulated computing environment on the host machine, through which the virtual machine can interact with the host machine's resources, such as network access, peripheral device access, disk storage, computing resources, etc. Such resources often include a non-persistent memory (e.g., a random access memory) for temporarily storing data and a persistent memory (e.g., a disk drive) for providing non-volatile data storage.

When interacting with data, the system may read or write data from the non-persistent memory as well as the persistent memory. Furthermore, on a periodic basis, data within the non-persistent memory can be written to the persistent memory. For example, a virtual machine may generate three blocks of data within the non-persistent memory (e.g., data consisting of blocks A, B, and C). In order to write the data to the persistent memory, the blocks go through several layers of operations such as virtual machine operating system layers (e.g., file system, block device, hardware device layers), then host bus adapter layers (e.g., the hardware/firmware for connection to underlying resources), and finally to the actual hardware device (e.g., the persistent memory). Not only does each block go through a plurality of the layers described above, but file system(s) maintained by the virtual machine and/or hypervisor may generate various data, such as mode pointers and metadata, that describe the data stored in the persistent memory.

In the middle of writing data to persistent storage, for example in the middle of writing block B to persistent storage, a system crash may occur (e.g., system failure, loss of power, irrecoverable error, etc. requiring system restart). Depending on what metadata has been written to disk, where the data is within the various layers, what data has been written to disk, what data has not been written to disk, and so on, there is the potential for a great deal of inconsistency in the data stored within the persistent memory. That is, the metadata stored in the persistent memory will likely be different from the actual data stored in the persistent memory. Thus, in order to bring the system effected by the failure back online and correct any inconsistencies, a time consuming and computationally intensive recovery process including reconstructing the file system data structures must be run on all the data within the file system stored on the persistent memory.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

A method and apparatus is disclosed herein for maintaining data consistency in persistent memory in an in-place-update file system of a deduplication computing system. In embodiments discussed herein, a data write request may be processed by the deduplication computing system to write a block of data from a volatile memory to a non-volatile memory in the in-place-update file system. The data write request can be a request to write a new block to non-volatile memory, as well as to modify an existing block of data in the non-volatile memory. For example, the data write request may be any of a new data write, overwrite, copy-on-write, or data redirect. Since there are different types of writes, which may impact the data stored in the in-place-update file system in different ways, it is determined whether the data write request modifies an existing block in the non-volatile memory, or does not modify an existing block. When the data write request modifies the existing block, the type of write operation associated with the request from a request write operation type is converted to a new data allocation write operation. As will be discussed in greater detail below, the new data allocation write operation is used to write the block of data from the volatile memory to the non-volatile memory using an ordered sequence of file system data journaling and writes to the non-volatile memory. In the embodiments discussed in greater detail below, the specific ordered sequence of operations is chosen to increase the consistency of data in non-volatile memory in the event of a system crash, and further to enable a highly efficient recovery process to correct data inconsistencies when recovering file system data after a crash.

Figure 1:
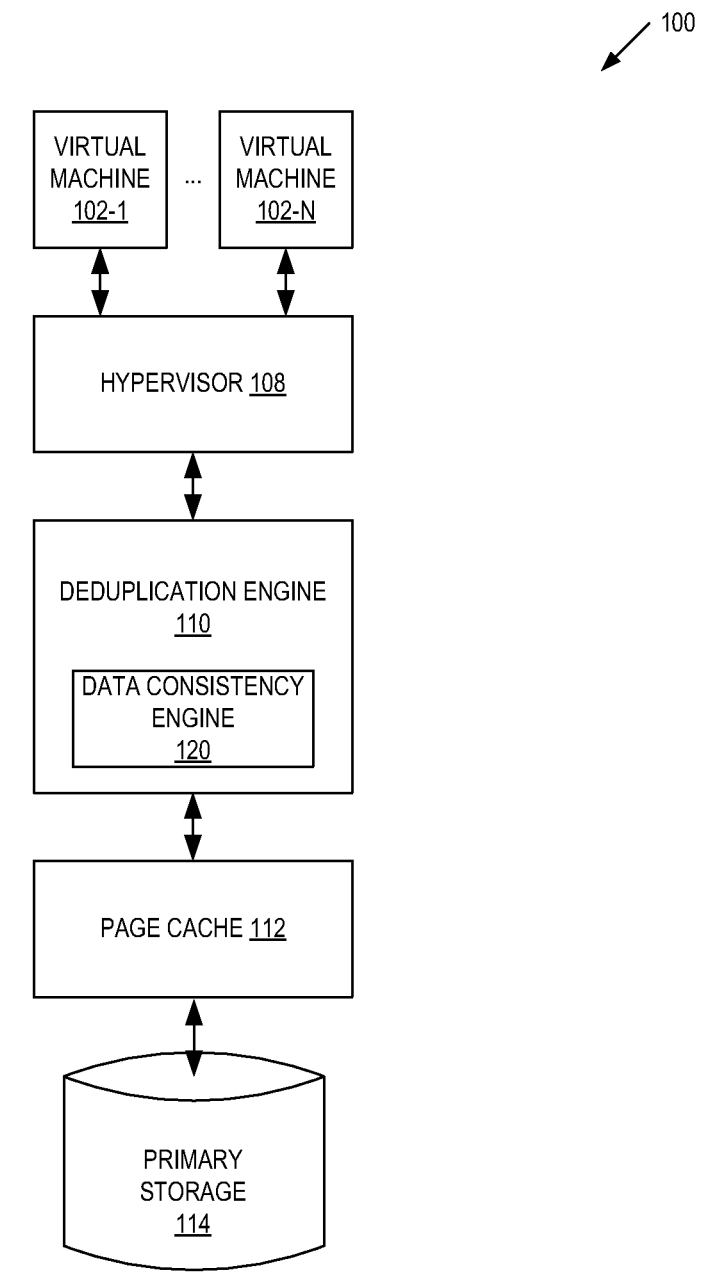
FIG. 1 is a block diagram of exemplary system architecture for maintaining data consistency in persistent memory in an in-place-update file system.

FIG. 1 is a block diagram of exemplary system architecture 100 for maintaining data consistency in persistent memory in an in-place-update file system. In one embodiment, the system 100 includes a deduplication computing system 101 that provides a virtualized computing environment. In one embodiment, the virtualized computing environment of deduplication computing system 101 includes one or more virtual machines (i.e., VM 102-1 through 102-N), hypervisor 108, deduplication engine 110, page cache 112, and primary storage 114. The number, type, configuration, topology, connections, or other aspects of deduplication computing system 101, may be varied and are not limited to the examples shown and described. For example, VM 102-1 through 102-N could be physical computing nodes in a physical computing system, as well as a combination of virtual and physical nodes.

In deduplication computing system 101, a virtual machine (i.e., VM 102-1 through 102-N) may be an instance of an operating system running on various types of hardware, software, circuitry, or a combination thereof (e.g., x86 servers) that are managed by hypervisor 108. As shown, deduplication engine 110 may be used to deduplicate data to be written to primary storage 114 using page cache 112 as a memory into which data may be read or written before being asynchronously (or, in some embodiments, synchronously) written back to primary storage 114. In one embodiment, deduplication engine 110 can be run on a physical computing node in the deduplication computing system 101. In another embodiment, deduplication engine 110 can be run by a virtual computing node in the deduplication computing system 101, such as one of virtual machines 102-1 through 102-N.

In one embodiment, deduplication engine 110 removes duplicate information in VM files in a read or write path of the virtualized computing environments (i.e., Virtual Desktop Infrastructure (VDI)/Hosted Virtual Desktop ("HVD")) of the deduplication computing system 101. Duplicate information is any block information that is already stored in primary storage 114, from a prior copy of the same data or from a different data set.

In some embodiments, a virtualized computing environment may be composed of a plurality of VMs, such as virtual machine 101-1 and 102-N, running desktop operating systems (e.g., Windows XP or Windows 7 Enterprise by MICROSOFT CORPORATION® of Redmond, Wash.) on a virtualized hardware layer (such as those provided by companies such as VMWARE®, CITRIX®, MICROSOFT®, REDHAT®, or other makes of operating systems). A virtualized software layer (e.g., hypervisor 108) provides memory, disk (e.g., storage), and processing (i.e., CPU) resources to the VMs. The plurality of VMs, in one embodiment, access storage through deduplication engine 110.

In one embodiment, deduplication engine 110 is configured to identify and remove duplicate information, replacing the duplicate information with pointers to a single copy of data, while a write operation from one or more of the VMs is still "in-flight" (i.e., sent to, but not written to permanent storage or disk (hereafter referred to as "primary storage")). In one embodiment, the deduplication uses page cache 112 of a deduplication engine 110. That is, page cache 112 is a non-persistent memory for use by deduplication engine 110, such as a flash memory, general purpose random access memory ("RAM"), etc. that requires power to maintain the data stored therein. In embodiment, as discussed below, data from page cache 112 is periodically flushed, or committed, to primary storage 114. In one embodiment, deduplication engine 110 may be configured to perform operations (e.g., read, write, copy on write, overwrite, redirect, and other operations) on blocks of fixed lengths, such as 4 kilobyte blocks. In another embodiment, blocks of variable lengths may be processed by deduplication engine 110 in accordance with the description herein. In one embodiment, the deduplication engine 110 processes data "inline," i.e., in the data path or connection between a VM and primary storage, in real time or substantially real-time. In one embodiment, deduplication engine 110 may be configured to provide an inline and real-time or substantially real-time deduplication of data as the data is in-flight from one or more of VMs 102-1 and 102-N to primary storage 114.

A primary storage system may be implemented using a computer hard disk based on rotational spindle, a computer hard disk based on Solid State Technologies, a redundant array of independent disks (hereafter "RAID") storage system that aggregates multiple computer hard disks, a storage area network (hereafter "SAN"), network attached storage (hereafter "NAS") that aggregates multiple RAID storage systems, among others. That is, primary storage 114 is a persistent memory that does not require power to maintain the data stored therein.

In one embodiment, deduplication engine 110 is configured to eliminate duplicate copies of data to effect a form of data compression to maximize storage capacity of primary storage 114, and minimize time to storage. In a deduplication-based file system, such as those implemented by deduplication computing system 101 deduplication engine 110 identifies duplicate copies of data, and implements reference links to point to the original data rather than storing another, redundant copy. As a result, duplicate data is not stored in primary storage 114, according to embodiments discussed herein. For example, deduplication engine 110 can store a reference link to the original data, instead of storing the duplicate data, in the form of deduplication metadata, which functions to describe the relationship between the original data and the deduplicated data. Examples of techniques used in deduplication of virtual machine files are described in U.S. Pat. No. 8,996,800, entitled "Deduplication of Virtual Machine Files in a Virtualized Desktop Environment," which is incorporated herein in its entirety.

In embodiments discussed herein, deduplication engine 110 stores deduplication metadata in one or more of a metadata file, metadata table, metadata database, or other format, in order to describe or map the relationships between the deduplicated data and the original data. In one embodiment, the deduplication metadata is organized to reflect individual files, as well as entire deduplicated file systems that are stored on primary storage 114. For example, one or more metadata files, tables, or databases can store data representing a block number that is associated with the physical location or data block of data in a storage device in a deduplicated file system. The metadata representing a block of a file or file system can contain data representing information such as a block number, a number of references associated with the block, data associated with a unique identifier that uniquely identifies the data block in the file or file system, a reference link that associates the block of deduplication metadata to a physical location where the corresponding data block for the file can be located, as well as other metadata. In one embodiment, the unique identifier is a hash value generated by a hashing function, such as a SHA-1, MD5, etc. function.

In one embodiment, deduplication computing system 101 utilizes an in-place-update file system for reading data, writing data, and maintaining data in primary storage 114. The file system is referred to as an in-place-update file system because blocks of data written to a location on disk are read and updated from that location. That is, the block of data is not moved to another location on disk as a result of subsequent data reads and data updates. In one embodiment, the data is maintained with the in-place-update file system in primary storage using i-nodes (i.e., an index node data structure that represent files, folders, user data, OS images, etc. in a file system). The data structures of the i-nodes contain a pointer structure of pointers to the actual blocks of data for a corresponding file, folder, etc. within the primary storage 114. Furthermore, deduplication metadata is maintained in primary storage that describes the deduplicated relationship between the i-node structure and the underlying data within primary storage 114. The present description should not be limited to the use of i-node data structures, however, as other files, data structures, etc. may be used consistent with the discussion herein.

When an i-node in a file system is to be updated, such as writing a new block to that i-node, the file system will perform several sequential operations: (a) allocating the data block and a memory page; (b) copying the data to the memory page; (c) updating deduplication metadata accordingly; (d) writing the data to the persistent storage 114; and (e) writing/updating deduplication metadata on persistent storage 114. Thus, a write operation is actually a complex series of several operations, which travel through various layers of an operating system and hardware components before the write is committed. Deduplication computing system 114 is continuously performing write operations to commit data, individually, in batches, or in transactions as will be discussed in greater detail below. Since there is constant writing from the non-persistent storage of page cache 112 to the persistent storage of primary storage 114, and since there is the possibility of failure at anytime, the are many opportunities for data inconsistency when a failure occurs between operations (d) and (e). For example, a block of data may be written to primary storage 114 and a failure occurs before file system or deduplication metadata associated with the block is written to primary storage 114, or updated on primary storage 114. Thus, data corruption will occur because the file system and deduplication metadata are not consistent with the data actually stored in the primary storage 114. A recovery process must then be performed to clean up and resolve the corrupt data.

In one embodiment, data consistency engine 120 may be deployed in deduplication engine 110 to transform write operations to virtually atomic write operations in the deduplication computing system 101. An atomic write operation refers to a write operation that either does, or does not, succeed. That is, the write operation will succeed entirely by writing the data to primary storage 114 and updating the deduplication metadata in primary storage 114, or will fail entirely by not writing the data to primary storage 114 and maintaining the deduplication metadata in primary storage 114. The virtual atomicity of write operations is achieved by data consistency engine 120 by processing write operations using journaling in the file system and performing an ordered sequence of operations to write data to primary storage 114.

Data consistency engine 120 employs file system journaling to track data blocks and associated metadata that are to be created, modified, replaced, etc. from a file system write operation. Furthermore, the journaling will also track the operation(s) that are to be carried out to accomplish the write operation, such as tracking the writing of an i-node, i-node update, data block, metadata, etc. to primary storage 114. The journaling tracks the above mentioned data, as well as the physical locations in primary storage to which the various data items are to be written. As a result the use of data journaling creates a type of intent log regarding the data and operations to be performed to accomplish a write operation. As will be discussed in greater detail below, when there is a crash in deduplication computing system 101, the journaled information concerning write operations may be utilized to correct data inconsistencies that are not able to be made atomic from the ordered sequence of write operations processed by data consistency engine 120.

In one embodiment, data consistency engine 120 will interact with deduplication computing system's 101 file system and memories to perform a specific sequence of write operations for writing data from page cache 112 to primary storage 114, which transforms a write operation into a virtually atomic write operation (e.g., one that either does or does not succeed as a whole, thus maintaining data consistency within primary storage 114). Consider an in-place-update overwrite, copy-on-write, or other write operation that transforms an existing data block in primary storage 114 to include new data, or adds a new data block to primary storage 114, with accompanying deduplication metadata changes. Without journaling and without performing the sequence of data operations that will be discussed below, the write operations update/modify an i-node stored in primary storage that points to an existing block of data and is associated with existing metadata. The process would then write the deduplication entry/update to primary storage 114 and then write the i-node entry/update to primary storage 114. If a system crash occurs at some point in time between the writing of deduplication and/or i-node updates to primary storage 114, then data in primary storage 114 will be inconsistent and a recovery process must be performed. Furthermore, to recover the file system data, the recovery process must be performed by checking and/or updating the entire file system. Thus, the recovery time is a function of the file system size, which may be rather large causing potentially significant delays as a result of the recovery process.

In one embodiment, data consistency engine 120 processes and manages all write operations as new data write operations with file system journaling. For a write operation that writes a new block of data to primary storage 114, data consistency engine 120 will perform, among other low level file system operations, (a) disk space allocation in primary storage 114; (b) write deduplication entry for the data write to primary storage 114; (c) write the data to primary storage 114; (d) write the i-node entry to the journal to record the intent to point to i-node to the new data; and (e) write the i-node to primary storage 114. When a crash occurs for a new data write operation after operation (e), the data, metadata, and i-node are consistent with the data stored in primary storage 114. Furthermore, prior to operation (d) the data structures in primary storage 114 are consistent with one another, and the data written to primary storage before the crash can simply be disregarded by the file system during a subsequent recovery process in the event of a crash. Finally, if a crash occurs between (d) and (e), the write operation can be recovered from the journaled i-node entry to reflect the committed write operation. Beneficially, the new data write operation becomes atomic for nearly the entire write process, except for the scenario where a crash occurs between operations (d) and (e). However, recovery time associated with resolving data inconsistency is greatly reduced in such a scenario since the resulting recovery time is a function of the journal size, which is dramatically smaller than the file system size. As will be discussed in greater detail below with respect to FIGS. 3 and 4, the remaining types of write operations, such as in-place-update overwrite, copy-on-write, and redirect operations, may also be made virtually atomic.

Figure 2:
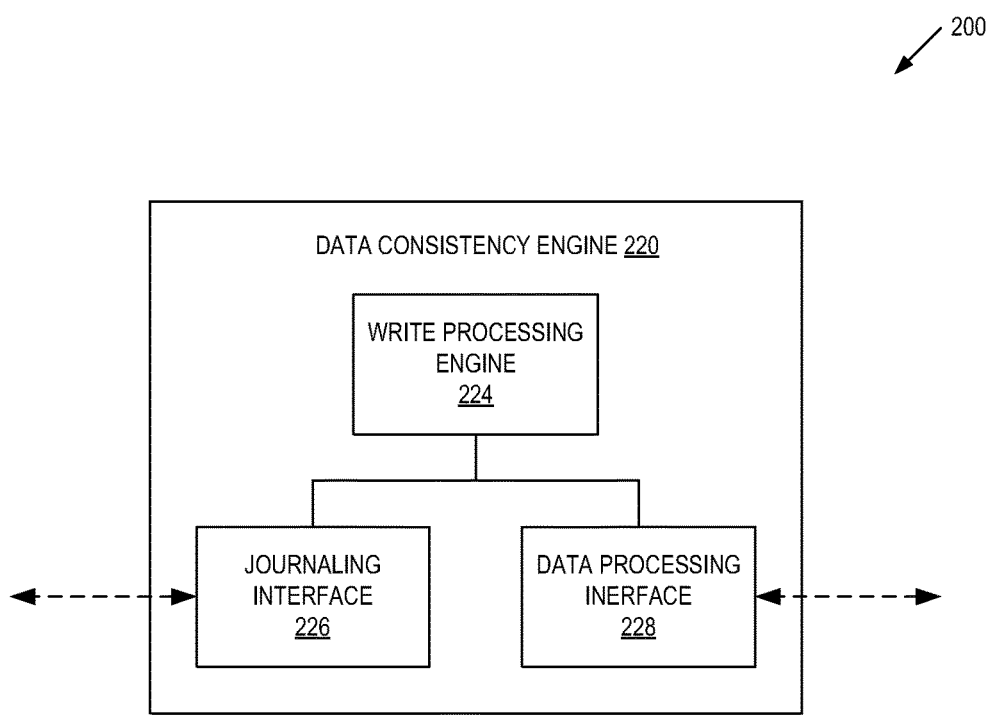
FIG. 2 is a block diagram of one embodiment of a data consistency engine.

FIG. 2 is a block diagram of one embodiment 200 of a data consistency engine. Data consistency engine 220 performs data write management to ensure data consistency in a deduplication computing systems non-volatile memory, such as one or more primary storage device(s). The data write management may include issuing certain write operations, as well as interacting with other operating system, deduplication, or file system components etc. In one embodiment, data consistency engine 220 includes a write processing engine 224, a journaling interface 226 and a data processing interface 228. These components of data consistency engine 220, and the functions and processes performed by each, may be distributed among one or components of a deduplication computing system, such as a hypervisor, a virtual machine, and/or a deduplication engine.

Write processing engine 224 is responsible for managing the operations that are to be performed during a requested write operation. The operations that are to be performed may include generating specific write operations for committing data to a non-volatile memory, such as writing metadata entries/updates to a non-volatile storage device, writing data blocks to non-volatile memory, and writing i-nodes and/or i-node updates to non-volatile memory. In embodiment, write processing engine 224 issues the associated write operations to data processing interface 228, which in turn issues the corresponding write operations to the appropriate software, firmware, and/or hardware components of a deduplication computing system to accomplish the write operations.

Write processing engine 224 is also responsible for managing the journaling of specific write operations. As discussed herein, the journaling of a write operations includes tracking data, metadata, i-nodes, and/or physical locations in non-volatile memory associated with write operations. Write processing engine 224 provides journaling commands to journaling interface 226, which may write to a file system journal to record the intended write operations. In one embodiment, write processing engine 224 may communicate the requested journaling data to a journaling application (not shown).

In one embodiment, in response to a write operation in a deduplication computing system, write processing engine 224 issues various journaling operation and write operation commands for committing data to a non-volatile memory of deduplication computing system. As discussed herein, the journaling and file system write operations are performed in one or more specific sequences, depending on the requested write operation, to ensure the virtual atomicity of a requested write operation (e.g., write new data, overwrite existing data, copy-on-write, and redirection), and thus data consistency between i-node data structure(s), metadata structure(s), and data blocks in non-volatile memory. Furthermore, as discussed herein, when there is data inconsistency after a system crash, the sequence of write operations and data journaling ensures that a system recovery process may be performed from journal entries, and not the file system as a whole. Thus, the data within a non-volatile memory is maintained at a higher degree of consistency, and recovery from a system crash is made much more efficient by reducing what is to be processed during the recovery process.

Figure 3:
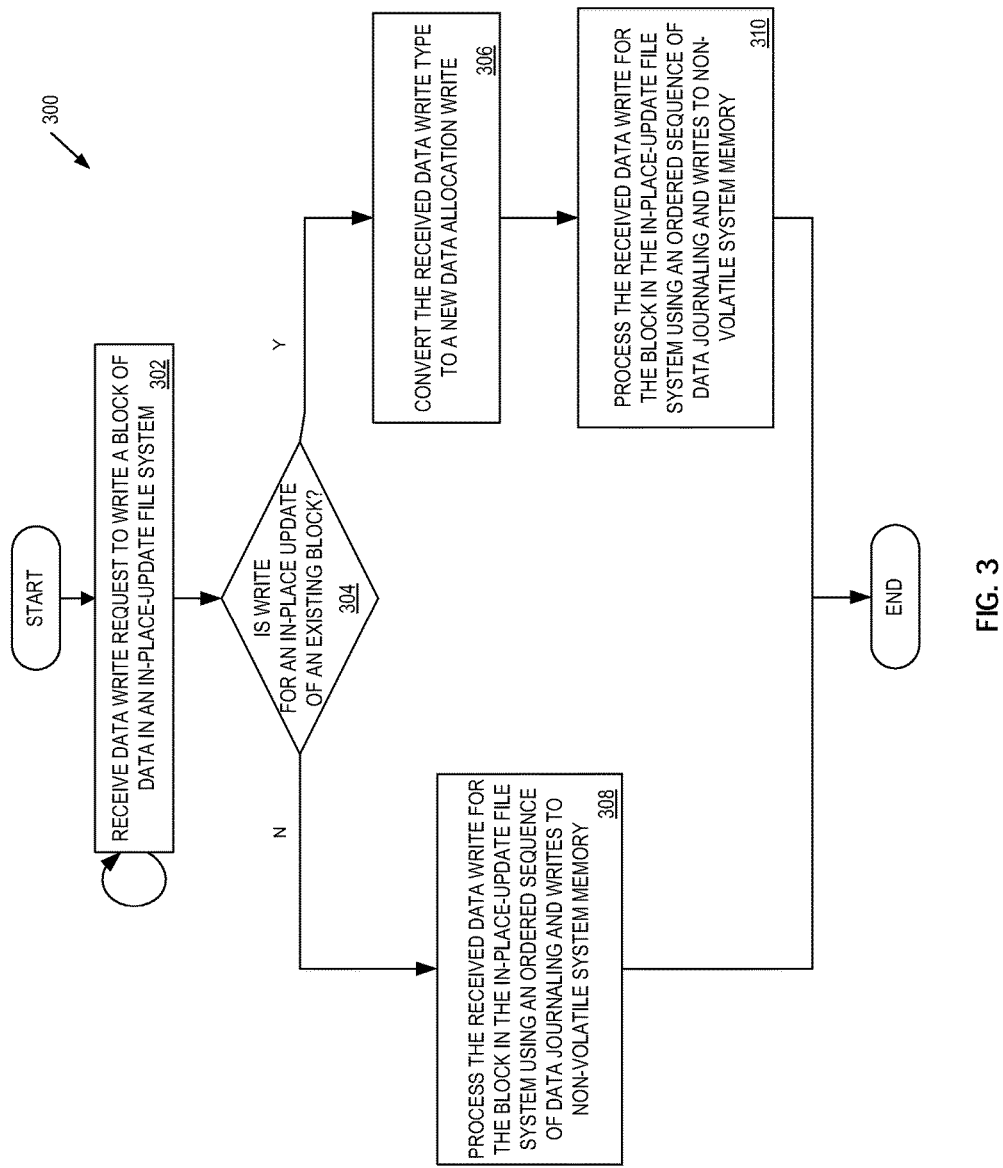
FIG. 3 is a flow diagram of one embodiment of a method for maintaining data consistency in persistent memory in an in-place-update file system when processing write operations.

FIG. 3 is a flow diagram of one embodiment of a method 300 for maintaining data consistency in persistent memory in an in-place-update file system when processing write operations. The method 300 is performed by processing logic that may comprise hardware (circuitry, dedicated logic, etc.), software (run on a general purpose computer system or a dedicated machine), firmware, or a combination. In one embodiment, the method 300 is performed by a data consistency engine, such data consistency engine 120 and 220, described above with respect to FIG. 1 and FIG. 2.

Referring to FIG. 3, the process begins by receiving a data write request to write a block of data in an in-place-update file system (processing block 302). The in-place-update file system may be utilized in a computing system that includes data deduplication. The write operations are continuous and/or periodic and are issued by an operating system (OS) or virtual OS. Furthermore, the write requests may be the result of user interactions with the OS, user interactions with a virtual OS, a plurality of users interacting with a plurality of virtual OSs, etc. The write requests commit, or flush, data stored in a temporary volatile memory of the computing system to a non-volatile primary storage of the computing system.

Processing logic determines whether the write operation updates an existing block of data (processing block 304). That is, processing logic determines whether the received write request is to write a new block of data or to perform an update (e.g., overwrite, copy-on-write, or redirect) to an existing block of data within a non-volatile memory of the computing system.

When the received write is to write a new block of data (processing block 304), processing logic processes the received data write for the block in the in-place-update file system using an ordered sequence of data journaling and writes to non-volatile memory of the computing system (processing block 308). One embodiment of the ordered sequence of journaling and writes to non-volatile memory for writing a new block of data to non-volatile memory is discussed above as write operations (a)-(e).

However, when the received write is to perform an in-place update of an existing block of data in the non-volatile memory (processing block 304), processing logic converts the received data write type to a new data allocation write (processing block 306), and also processes the received data write for the block in the in-place-update file system using an ordered sequence of data journaling and writes to non-volatile memory of the computing system (processing block 310). In one embodiment, the ordered sequence of journaling and write operations to non-volatile memory performed in processing block 310 is different from those performed in processing block 308. One embodiment, of the operations performed when writing a block of data that impacts an existing block is discussed below in FIG. 4.

Figure 4:
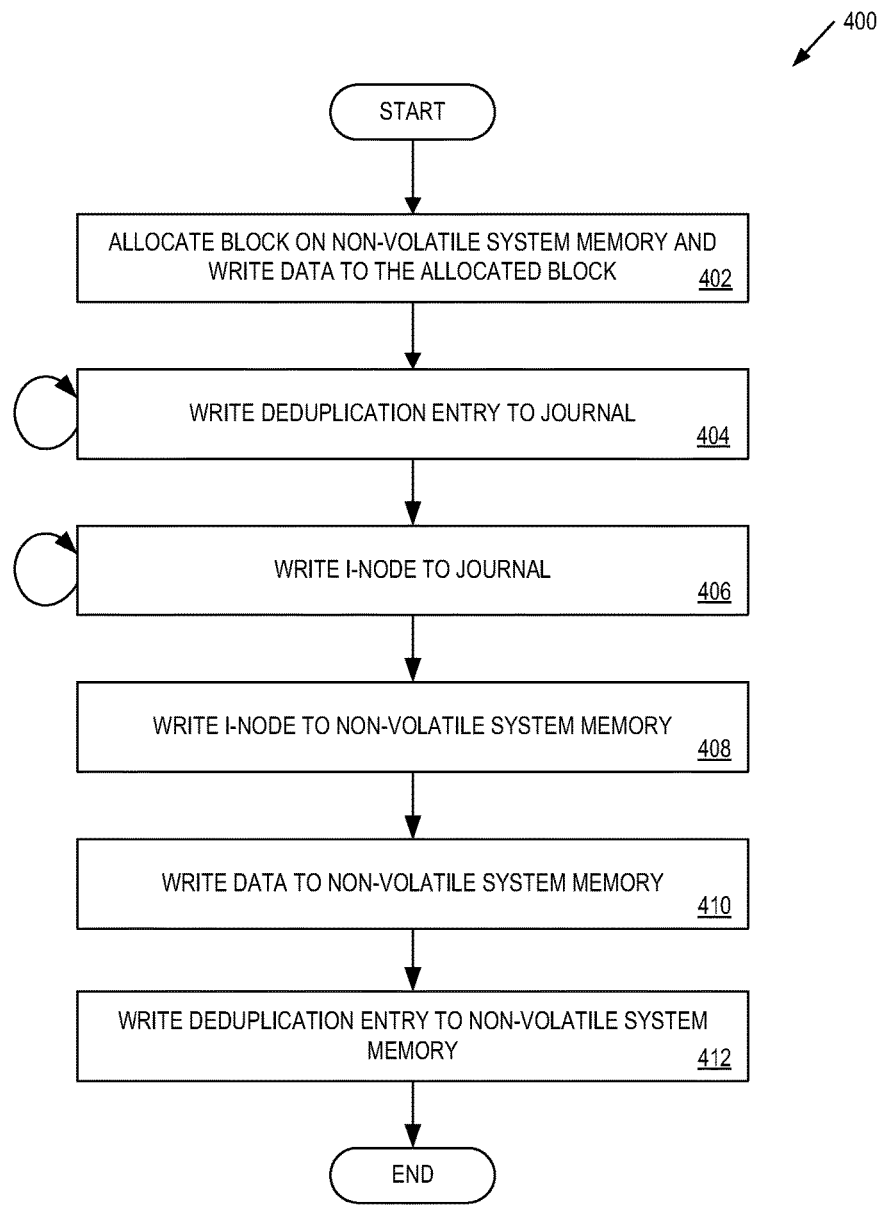
FIG. 4 is a flow diagram of one embodiment of a method for performing an ordered sequence of data journaling and writes to non-volatile memory to maintain data consistency in the persistent memory of an in-place-update file system.

FIG. 4 is a flow diagram of one embodiment of a method 400 for performing an ordered sequence of data journaling and writes to non-volatile memory to maintain data consistency in the persistent memory of an in-place-update file system. The method 400 is performed by processing logic that may comprise hardware (circuitry, dedicated logic, etc.), software (run on a general purpose computer system or a dedicated machine), firmware, or a combination. In one embodiment, the method 400 is performed by a data consistency engine, such data consistency engine 120 and 220, described above with respect to FIG. 1 and FIG. 2.

Referring to FIG. 4, the ordered sequence of data journaling and writes begins by allocating a block of data in non-volatile system memory and writing the data to the allocated block (processing block 402). As discussed above, the write operation corresponds to a write that udpates, replaces, or otherwise modifies an existing block of data in a file system. Thus, an existing i-node in the in-place-update file system, the data block on disk, and the metadata on disk associated with the data are all impacted by the write operation.

Figure 5:
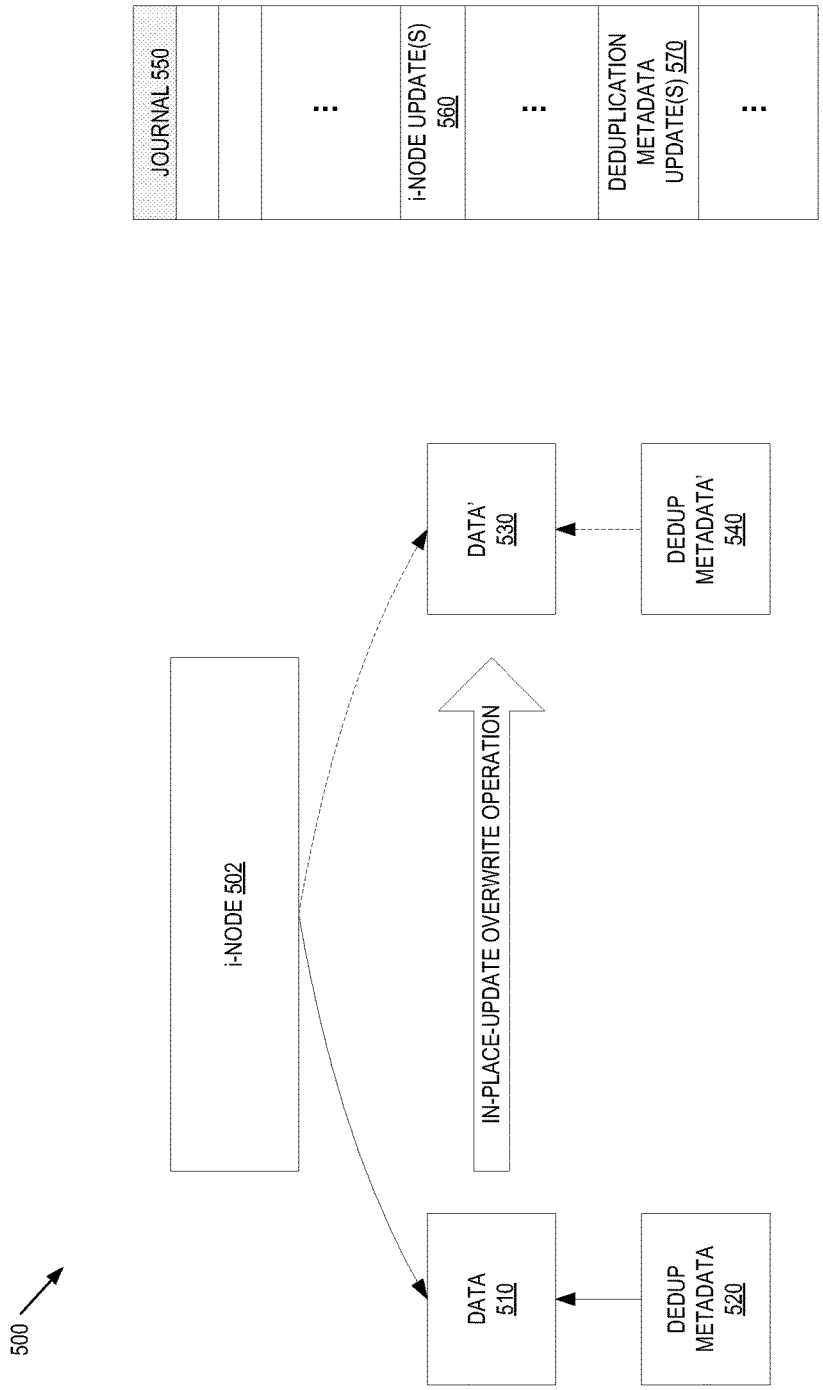
FIG. 5 is a block diagram illustrating an in-place-update overwrite operation and a file system journal according to one embodiment.

For example, FIG. 5 illustrates an in-place-update overwrite operation 500 according to one embodiment. As illustrated, the i-node data structure 502 points to data block 510 on disk (not shown), which is in turn associated with deduplication metadata 520 (e.g. identifier, reference count, pointer value, etc.) that also points to data 510. Although the requested write operation will alter data 510, the write operation has been converted to a new data write operation, as discussed above in FIG. 3. Thus, a block of data, illustrated as data' 530, is allocated in the non-volatile system memory.

Returning to FIG. 4, after allocating the new block in non-volatile system memory, processing logic writes a deduplication metadata entry to the file system journal (processing block 404). Writing the deduplication metadata entry can include a plurality of operations that generate/update deduplication metadata including incrementing or decrementing reference counts, updating pointers, generating unique identifiers for a data block, etc. The operations performed are based on the type of write operation, and its impact on existing data within non-volatile system memory. Processing logic further writes i-node modifications for the new pointer to the allocated data block (processing block 406). In one embodiment, where the journal tracks intended file system modifications, the deduplication and i-node entries recorded in the journal record the new/updated data.

For example, in FIG. 5, journal 550 tracks the intended changes 560 to the i-node pointer from data in block 510 to data' in block 530, and tracks the deduplication metadata changes 570 that will result when changing deduplication metadata' 540 for the updated data in data' 530 (e.g., updating unique identifiers, adjusting reference counters, etc. as a result of an overwrite, copy-on-write, or redirection).

Returning again to FIG. 4, processing logic writes the i-node to non-volatile system memory (processing block 408), such as writing the updated pointer value to the i-node in the non-volatile system memory. Processing logic also writes the data to non-volatile system memory (processing block 410) and writes the deduplication entry to non-volatile system memory (processing block 412). The operations performed in processing blocks 408-412 write the data and the metadata to the in-place-update file system's non-volatile memory.

The ordered sequence of journaling and write operations discussed above with respect to FIG. 4 and FIG. 5 ensure that a write operation, such as an overwrite, copy-on-write, redirect are virtually atomic operations. Table 1 below lists the possible times during the ordered sequence of journaling and writes where the in-place-update file system may crash.

TABLE 1

| Crash | i-Node Points To | Deduplication Metadata Points To | Consistency in Non-Volatile System Memory |
|---|---|---|---|
| Before 402 | DATA (510) | DATA (510) | YES |
| Between 402 and 404 | DATA (510) | DATA (510) | YES |
| Between 404 and 406 | DATA (510) | DATA (510) | YES |
| Between 406 and 408 | DATA (510) | DATA (510) | YES |
| Between 408 and 410 | DATA' (530) | DATA (510) | NO - RESOLVEABLE BY JOURNALED ENTRIES |
| After 410 | DATA' (530) | DATA' (530) | YES |

With reference to Table 1, a crash may occur between any of the processing blocks illustrated and discussed in FIG. 4. However, if there is a crash at any time before processing block 408, the data pointed to by the i-node and the deduplication metadata is the same data, and thus there is consistency in the non-volatile system memory. In a recovery process, the consistency does not require action on the data in block 510 or allocated block 530' since the file system data is consistent. Instead, the allocated data block is freed for use for later write operations. Similarly, if there is a crash after processing block 410, there is also consistency in the non-volatile system memory with respect to the newly written block of data' 530 (corresponding to the overwrite, copy-on-write, or redirect write operation). In the event that a crash occurs between processing block 408 and 410, there is inconsistency between the data pointed to by the i-node and the data pointed to by the deduplication metadata. However, this inconsistency may be resolved through a recovery process using the data journal, rather than the file system itself.

Therefore, although the write operations used when committing data from a volatile memory to a non-volatile memory include several sub operations that go through a system stack including software and hardware layers, the embodiments discussed herein render the write operations virtually atomic. That is, the write operations fully succeed or do not succeed with respect to data in non-volatile system memory, which ensures data consistency with respect to the file system's in-memory data structures and the data in the non-volatile system memory. Furthermore, in the event that there is inconsistency in data in non-volatile system memory, the inconsistency may be efficiently resolved by utilizing a file system journal for system recovery rather than the file system itself.

It will be apparent to one of ordinary skill in the art that the order of the journaling operations of processing blocks 404-406 discussed in FIG. 4 are illustrative and may be performed in any order. Similarly, the writing of data to non-volatile system memory in processing blocks 408-412 are also illustrative and may be performed in any order. So long as the allocation operation of processing block 402 occurs first, and the journaling operations of processing blocks 404-406 occur before the writing of the i-node, data, and deduplication metadata to non-volatile system memory of processing blocks 408-0412. The sequence of allocation, writing, and journaling for writing a new block of data to non-volatile system memory (e.g., write operations (a)-(e) discussed above in FIG. 1) may similarly be altered.

In one embodiment, file system data and deduplication metadata changes, additions, and modifications are processes in transactions. That is, a certain number of changes occur in system cache/volatile memory and may be accumulated before being flushed for storage in non-volatile system memory. These accumulated data changes, metadata changes, and file system data changes are committed as a group in what can be referred to as a committing transaction. While that transaction is being committed (i.e., while the data from the transaction is written to, or update in, non-volatile memory), a new transaction begins to accumulate changes, and can be considered a running transaction. In such a transaction-based system, the data journaling and ordered sequence of write operations are performed as discussed above within each transaction.

It may be the case that data within a running transaction is modified more than once. In one embodiment, when the running transaction becomes a committing transaction, the cached data need only be committed once to non-volatile system memory, and each operation on that block that was performed within the transaction need not be performed in the non-volatile memory. This is the case because until the committed transaction is flushed to non-volatile memory, the non-volatile memory is consistent and the final states of the updated data need only be committed to non-volatile memory.

It may also be the case that a running transaction seeks to modify the same data that is within a committing transaction. In this case, the running transaction will either create its own copy of the data and associated metadata from the committing transaction, which can be modified within the running transaction, or create a copy of the data for the committed transaction, which the running transaction will not modify. In one embodiment, a duplicate file system data page, block number of the data page, and journaling data structure/states are created. This ensures the states of the data, file system data, and deduplication metadata are consistent within the committing transactions that are flushed to non-volatile memory, and that the running transaction is free to modify its states for the data up until it too becomes a committed transaction.

Figure 6:
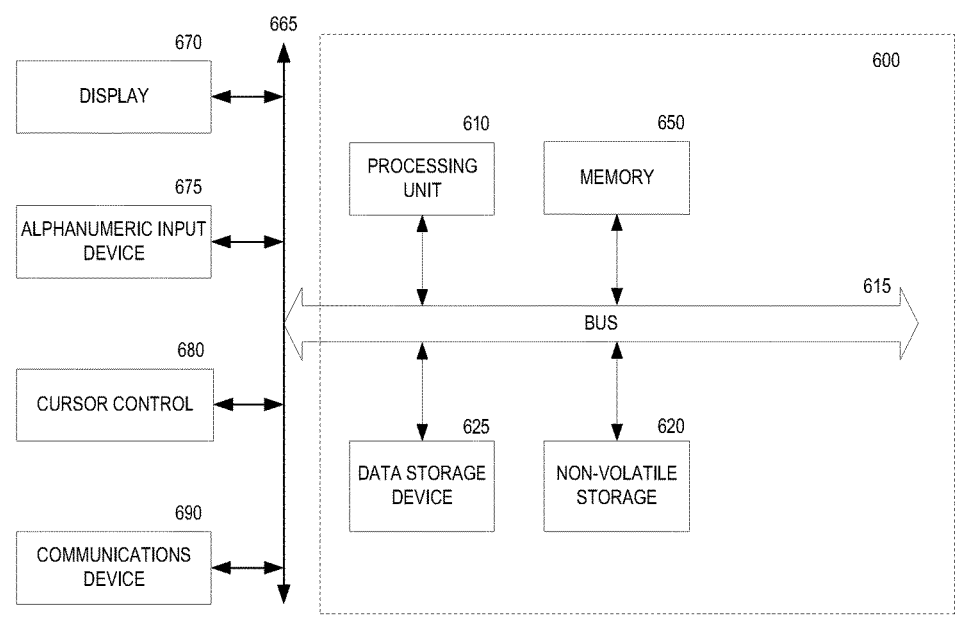
FIG. 6 illustrates an example schematic drawing of a computer network infrastructure.

FIG. 6 is one embodiment of a computer system that may be used with the present invention. It will be apparent to those of ordinary skill in the art, however that other alternative systems of various system architectures may also be used.

The data processing system illustrated in FIG. 6 includes a bus or other internal communication means 615 for communicating information, and a processor 610 coupled to the bus 615 for processing information. The system further comprises a random access memory (RAM) or other volatile storage device 650 (referred to as memory), coupled to bus 615 for storing information and instructions to be executed by processor 610. Main memory 650 also may be used for storing temporary variables or other intermediate information during execution of instructions by processor 610. The system also comprises a read only memory (ROM) and/or static storage device 620 coupled to bus 615 for storing static information and instructions for processor 610, and a data storage device 625 such as a magnetic disk or optical disk and its corresponding disk drive. Data storage device 625 is coupled to bus 615 for storing information and instructions.

The system may further be coupled to a display device 670, such as a light-emitting diode display (LED display) or a liquid crystal display (LCD) coupled to bus 615 through bus 665 for displaying information to a computer user. An alphanumeric input device 675, including alphanumeric and other keys, may also be coupled to bus 615 through bus 665 for communicating information and command selections to processor 610. An additional user input device is cursor control device 680, such as a mouse, a trackball, stylus, touchpad, or cursor direction keys coupled to bus 615 through bus 665 for communicating direction information and command selections to processor 610, and for controlling cursor movement on display device 670.

Another device, which may optionally be coupled to computer system 600, is a communications device 690 for accessing other nodes of a distributed system via a network. The communications device 690 may include any of a number of commercially available networking peripheral devices such as those used for coupling to an Ethernet, token ring, Internet, or wide area network. The communications device 690 may further be a null-modem connection, or any other mechanism that provides connectivity between the computer system 600 and the outside world. Note that any or all of the components of this system illustrated in FIG. 6 and associated hardware may be used in various embodiments of the present invention.

It will be appreciated by those of ordinary skill in the art that any configuration of the system may be used for various purposes according to the particular implementation. The control logic or software implementing the present invention can be stored in main memory 650, mass storage device 625, or other storage medium locally or remotely accessible to processor 610.

It will be apparent to those of ordinary skill in the art that the system, method, and process described herein can be implemented as software stored in main memory 650 or read only memory 620 and executed by processor 610. This control logic or software may also be resident on an article of manufacture comprising a computer readable medium having computer readable program code embodied therein and being readable by the mass storage device 625 and for causing the processor 610 to operate in accordance with the methods and teachings herein.

The present invention may also be embodied in a special purpose appliance including a subset of the computer hardware components described above. For example, the appliance may include a processor 610, a data storage device 625, a bus 615, and memory 650, and only rudimentary communications mechanisms, such as a small touch-screen that permits the user to communicate in a basic manner with the device. In general, the more special-purpose the device is, the fewer of the elements need be present for the device to function.

In the preceding description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "determining", "converting", "processing", "allocating", "writing", "performing", or the like, refer to the actions and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The processes and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

What is claimed is:

1. A method comprising:
   receiving, by a deduplication computing system having an in-place-update file system, a data write request to write a block of data from a volatile memory to a non-volatile memory of the deduplication computing system, wherein blocks of data written to a location in non-volatile memory using the in-place-update file system are read and updated from the location;
   determining, by the deduplication computing system, whether the data write request is to perform an in-place update of an existing block of data in the non-volatile memory;
   when the data write request is to perform the in-place update of the existing block, the deduplication computing system:
      converting a type of write operation associated with the request from a requested write operation type to a new data allocation write operation; and
      processing the new data allocation write operation to write the block of data from the volatile memory to the non-volatile memory using an ordered sequence of file system data journaling and writes to the non-volatile memory comprising:
         allocating a new block of data in the non-volatile memory and writing the block of data from the volatile memory to the allocated new block,
         writing one or more entries to a file system journal of the in-place-update file system indicating one or more updates to deduplication metadata and an index node that occur as a result of the data write request were completed as an in-place update, wherein the one or more entries written to the journal enable data inconsistency correction in the non-volatile memory using the one or more entries in the event of an unclean shutdown of the deduplication computing system, and
         after the one or more entries are written to the file system journal, writing updated metadata and an updated inode to the non-volatile memory of the in-place-update file system to refer to the allocated new block of data.

2. The method of claim 1, wherein writing one or more entries to a file system journal of the in-place-update file system further comprises:
   writing a deduplication metadata entry to the file system journal; and
   writing an index node entry to the file system journal.

3. The method of claim 2, wherein the deduplication metadata entry identifying one or more changes to existing deduplication metadata within the in-place-update file system that will be updated as a result of writing the block of data to the non-volatile memory, and wherein the index node entry identifying one or more changes to existing index node data structures within the in-place-update file system that will be updated as a result of writing the block of data to the non-volatile memory.

4. The method of claim 3, wherein after the allocating, writing the block of data, writing the deduplication metadata entry, and writing the index node entry, the method further comprising:
   writing the one or more changes to the existing index node data structures in the non-volatile memory, and
   writing the one or more changes to existing deduplication metadata in the non-volatile memory.

5. The method of claim 1, further comprising:
   determining that a crash has occurred in the deduplication computing system, the crash resulting in a loss of power to the volatile memory; and
   performing a recovery process on the in-place-update file system using the file system journal, the recovery process to correct inconsistencies between data stored in the non-volatile memory, deduplication metadata stored in the non-volatile memory, and index node data structure data stored in the non-volatile memory.

6. The method of claim 1, wherein the volatile memory is a page cache in the deduplication computing system, and wherein the non-volatile memory is a primary storage of the deduplication computing system.

7. The method of claim 1, further comprising:
   determining that the data write request does not modify any existing block; and
   performing a different ordered sequence of file system data journaling and writes to the non-volatile memory.

8. The method of claim 1, wherein the type of write operation associated with the request comprises one of an overwrite, a copy-on-write, or a redirect.

9. An article of manufacture having one or more non-transitory computer readable storage media storing executable instructions thereon which when executed cause a system to perform a method comprising:
   receiving, by a deduplication computing system having an in-place-update file system, a data write request to write a block of data from a volatile memory to a non-volatile memory of the deduplication computing system, wherein blocks of data written to a location in non-volatile memory using the in-place-update file system are read and updated from the location;
   determining, by the deduplication computing system, whether the data write request is to perform an in-place update of an existing block of data in the non-volatile memory;
   when the data write request is to perform the in-place update of the existing block, the deduplication computing system:
      converting a type of write operation associated with the request from a requested write operation type to a new data allocation write operation; and
      processing the new data allocation write operation to write the block of data from the volatile memory to the non-volatile memory using an ordered sequence of file system data journaling and writes to the non-volatile memory comprising:
  allocating a new block of data in the non-volatile memory and writing the block of data from the volatile memory to the allocated new block,
  writing one or more entries to a file system journal of the in-place-update file system indicating one or more updates to deduplication metadata and an index node that occur as a result of the data write request were completed as an in-place update, wherein the one or more entries written to the journal enable data inconsistency correction in the non-volatile memory using the one or more entries in the event of an unclean shutdown of the deduplication computing system, and
  after the one or more entries are written to the file system journal, writing updated metadata and an updated inode to the non-volatile memory of the in-place-update file system to refer to the allocated new block of data.

10. The article of manufacture of claim 9, wherein writing one or more entries to a file system journal of the in-place-update file system further comprises:
  writing a deduplication metadata entry to the file system journal; and
  writing an index node entry to the file system journal.

11. The article of manufacture of claim 10, wherein the deduplication metadata entry identifying one or more changes to existing deduplication metadata within the in-place-update file system that will be updated as a result of writing the block of data to the non-volatile memory, and wherein the index node entry identifying one or more changes to existing index node data structures within the in-place-update file system that will be updated as a result of writing the block of data to the non-volatile memory.

12. The article of manufacture of claim 11, wherein after the allocating, writing the block of data, writing the deduplication metadata entry, and writing the index node entry, the method further comprising:
  writing the one or more changes to the existing index node data structures in the non-volatile memory, and
  writing the one or more changes to existing deduplication metadata in the non-volatile memory.

13. The article of manufacture of claim 9, further comprising:
  determining that a crash has occurred in the deduplication computing system, the crash resulting in a loss of power to the volatile memory; and
  performing a recovery process on the in-place-update file system using the file system journal, the recovery process to correct inconsistencies between data stored in the non-volatile memory, deduplication metadata stored in the non-volatile memory, and index node data structure data stored in the non-volatile memory.

14. The article of manufacture of claim 9, wherein the volatile memory is a page cache in the deduplication computing system, and wherein the non-volatile memory is a primary storage of the deduplication computing system.

15. The article of manufacture of claim 9, further comprising:
  determining that the data write request does not modify any existing block; and
  performing a different ordered sequence of file system data journaling and writes to the non-volatile memory.

16. The article of manufacture of claim 9, wherein the type of write operation associated with the request comprises one of an overwrite, a copy-on-write, or a redirect.

17. A deduplication computing system with an in-place-update file system, the system comprising:
  a volatile memory;
  a non-volatile memory; and
  a processor coupled with the volatile memory and non-volatile memory to
    receive a data write request to write a block of data from the volatile memory to the non-volatile memory of the deduplication computing system, wherein blocks of data written to a location in non-volatile memory using the in-place-update file system are read and updated from the location,
    determine whether the data write request is to perform an in-place update of an existing block of data in the non-volatile memory,
  when the data write request is to perform the in-place update of the existing block, the deduplication computing system to:
    convert a type of write operation associated with the request from a requested write operation type to a new data allocation write operation; and
    process the new data allocation write operation to write the block of data from the volatile memory to the non-volatile memory using an ordered sequence of file system data journaling and writes to the non-volatile memory comprising the deduplication computing system to:
      allocate a new block of data in the non-volatile memory and writing the block of data from the volatile memory to the allocated new block,
      write one or more entries to a file system journal of the in-place-update file system indicating one or more updates to deduplication metadata and an index node that occur as a result of the data write request were completed as an in-place update, wherein the one or more entries written to the journal enable data inconsistency correction in the non-volatile memory using the one or more entries in the event of an unclean shutdown of the deduplication computing system, and
      after the one or more entries are written to the file system journal, write updated metadata and an updated inode to the non-volatile memory of the in-place-update file system to refer to the allocated new block of data.

18. The system of claim 17, further comprising the processor to:
  determine that a crash has occurred in the deduplication computing system, the crash resulting in a loss of power to the volatile memory, and
  perform a recovery process on the in-place-update file system using the file system journal, the recovery process to correct inconsistencies between data stored in the non-volatile memory, deduplication metadata stored in the non-volatile memory, and index node data structure data stored in the non-volatile memory.

19. The system of claim 17, further comprising the processor to:
  determine that the data write request does not modify any existing block, and
  perform a different ordered sequence of file system data journaling and writes to the non-volatile memory.

* * * * *